(12) United States Patent
Adema

(10) Patent No.: US 12,313,850 B1
(45) Date of Patent: May 27, 2025

(54) AUGMENTED REALITY OPTICAL PROJECTOR SYSTEM

(71) Applicant: GOOGLE LLC, Mountain View, CA (US)

(72) Inventor: Daniel Adema, Kitchener (CA)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/438,598

(22) Filed: Feb. 12, 2024

(51) Int. Cl.
*G02B 27/01* (2006.01)
*G06T 19/00* (2011.01)

(52) U.S. Cl.
CPC ........ *G02B 27/0172* (2013.01); *G06T 19/006* (2013.01); *G02B 2027/0178* (2013.01)

(58) Field of Classification Search
CPC ........ G02B 27/0172; G02B 2027/0178; G02B 26/0833; G06T 19/006; H01L 33/44
USPC .......................................................... 345/633
See application file for complete search history.

(56) References Cited

U.S. PATENT DOCUMENTS

| | | | |
|---|---|---|---|
| 10,698,218 B1 | 6/2020 | Geng et al. | |
| 2015/0187141 A1* | 7/2015 | Bromer | G02B 26/0833 345/633 |
| 2022/0059740 A1* | 2/2022 | Hahn | H01L 33/44 |

FOREIGN PATENT DOCUMENTS

| | | |
|---|---|---|
| EP | 4141514 A1 | 3/2023 |
| WO | 2018200417 A1 | 11/2018 |

OTHER PUBLICATIONS

Spagnolo, F. et al., "Design of a Low-Power Super-Resolution Architecture for Virtual Reality Wearable Devices", IEEE Sensors Journal, vol. 23, Issue 8; Apr. 15, 2023; pp. 9009-9016.
Wikipedia, "Wobulation", downloaded from <<https://en.wikipedia.org/wiki/Wobulation>> on Jan. 12, 2023; 2 pages.

* cited by examiner

Primary Examiner — Abdul-Samad A Adediran

(57) ABSTRACT

A projector design for a microLED augmented reality (AR) display system. The AR display includes a light engine comprising a microLED panel and a set of plates that oscillate out of phase. The system also includes a waveguide with an input coupler (IC) having an entrance pupil. The entrance pupil of the IC is substantially coplanar with the exit pupil of the light engine. This configuration allows for coupling of light from the light engine into the waveguide, enabling the display of augmented reality content. A set of plates are configured to rotate either about a common axis or their individual axes. These rotations may be facilitated by actuators such as voice coils, piezo actuators, or others, each capable of linear or rotary movement. The plates may be either driven individually but synchronized for cohesive operation, or jointly propelled by a shared actuator for collective movement.

9 Claims, 4 Drawing Sheets

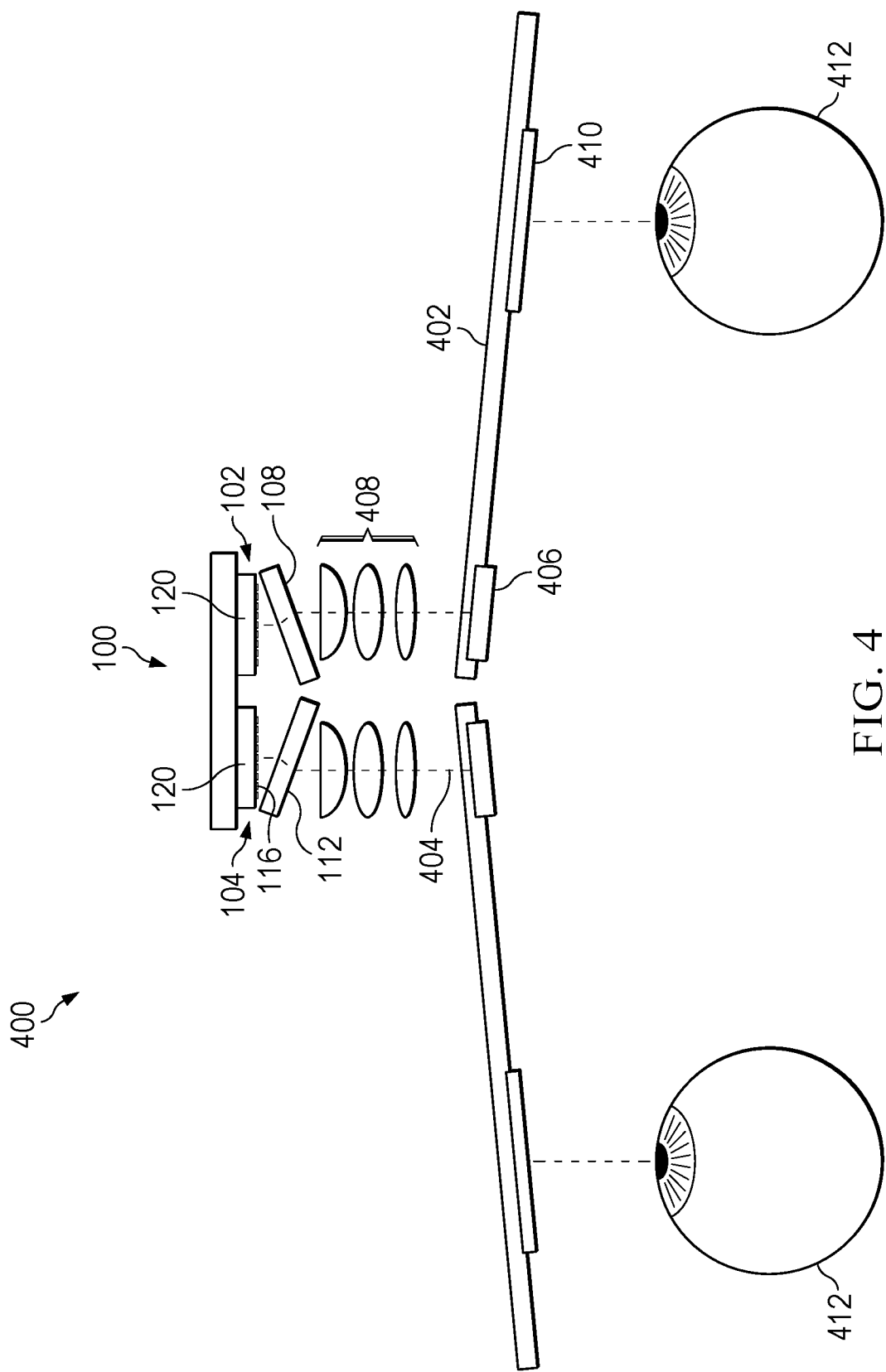

AUGMENTED REALITY OPTICAL PROJECTOR SYSTEM

BACKGROUND

Pixel-shifting and wobulation are two techniques employed in projection design for augmented reality (AR) systems to enhance image quality and resolution. Pixel-shifting involves the movement of pixels or sub-pixels within an image. By shifting these elements slightly in rapid succession, the projector creates additional sub-frames between the actual frames, thereby simulating a higher resolution and smoother image. This technique contributes to reducing the visibility of pixelation and enhancing overall image sharpness and clarity in AR projections. Wobulation, on the other hand, uses a mechanical or optical method to project and overlap two separate but slightly offset images in rapid succession. These images are projected in such a way that they interlace or "wobble" together, creating a composite image with enhanced resolution and reduced visibility of individual pixels. This process assists in minimizing the appearance of the pixel grid and improving the perceived image quality in AR systems. Both pixel-shifting and wobulation techniques aim to improve the visual experience in augmented reality by enhancing image sharpness, reducing pixelation, and providing a higher perceived resolution without increasing the native resolution of the projector. These methods contribute to creating more immersive and detailed AR projections for users.

Currently, the mechanism used for image shifting may involve an oscillating glass plate. The degree of pixel displacement is determined by factors such as the refractive index, thickness of the plate, and the angle at which the plate is positioned. Using oscillating plates in projection systems for augmented reality may present challenges. For example, the mechanical components, such as the oscillating plates, may introduce complexities within the projection system. The physical movement of plates introduces vibrations and mechanical noise, which may interfere with the immersive experience in AR applications. These vibrations may also potentially create distractions or discomfort for users, especially in scenarios requiring prolonged use. The use of an oscillating plate in projection systems for AR may introduce issues when it generates noise and vibrations. These disturbances become problematic, especially for projectors integrated into a head-mounted display (HMD). The proximity, and at times direct contact, of the projector with the user's head and ears exacerbate the discomfort caused by the vibrations and noise. This proximity amplifies the impact, leading to a more pronounced and bothersome experience for the user. The vibrations and noise may not only distract the user but also contribute to discomfort or irritation during prolonged usage, adversely affecting the immersive quality and usability of the augmented reality system.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

FIG. 4 is a diagram illustrating a top view of the AR optical projector system of FIGS. 1-3 with the left-eye projector and the right-eye projector each within the optical path of an input coupler (IC) of a waveguide and an output coupler (OC) substantially coplanar with an eye of a user in accordance with some embodiments.

DETAILED DESCRIPTION

FIGS. 1-4 illustrate example systems and methods for utilizing oscillating plates of an AR optical projector system in an AR optical projection system and configured to be substantially aligned with an IC of a waveguide due to their collaborative role in image manipulation and transmission. The oscillating plate is positioned within the optical path of the waveguide and assists in altering the direction and/or position of light as it travels through the waveguide. This coordinated action facilitates the control and redirection of the projected image and enhances the functionality and precision of the AR display. The oscillating plate's ability to manipulate light, coupled with the waveguide's role in guiding and transmitting this light, work together to implement image projection and alignment within the augmented reality system.

In a multi-aperture projection system designed for immersive experiences, such as for dual-eye (left and right) projection or separate apertures per eye, a set of oscillating glass plates are employed to enhance visual quality and depth perception. One method involves utilizing oscillating glass plates that operate out of phase with each other. For instance, this might entail two plates oscillating with a non-zero phase difference to manipulate the projected images. The system could also incorporate more than two plates, each oscillating with phase shifts, such as three plates with sine waves at 120-degree phase differences. These out-of-phase oscillations of the glass plates alter the light path for each eye or aperture, aiding in the manipulation of images. By controlling the phases of oscillation, the system can achieve accurate adjustments to the projected images, facilitating improvements in depth perception, color separation, polarization, or different field-of-views for each eye. The projected content for each eye or aperture is aligned using synchronized manipulation to enhance the immersive and realistic nature of the augmented reality or virtual reality experience.

Figure 1:
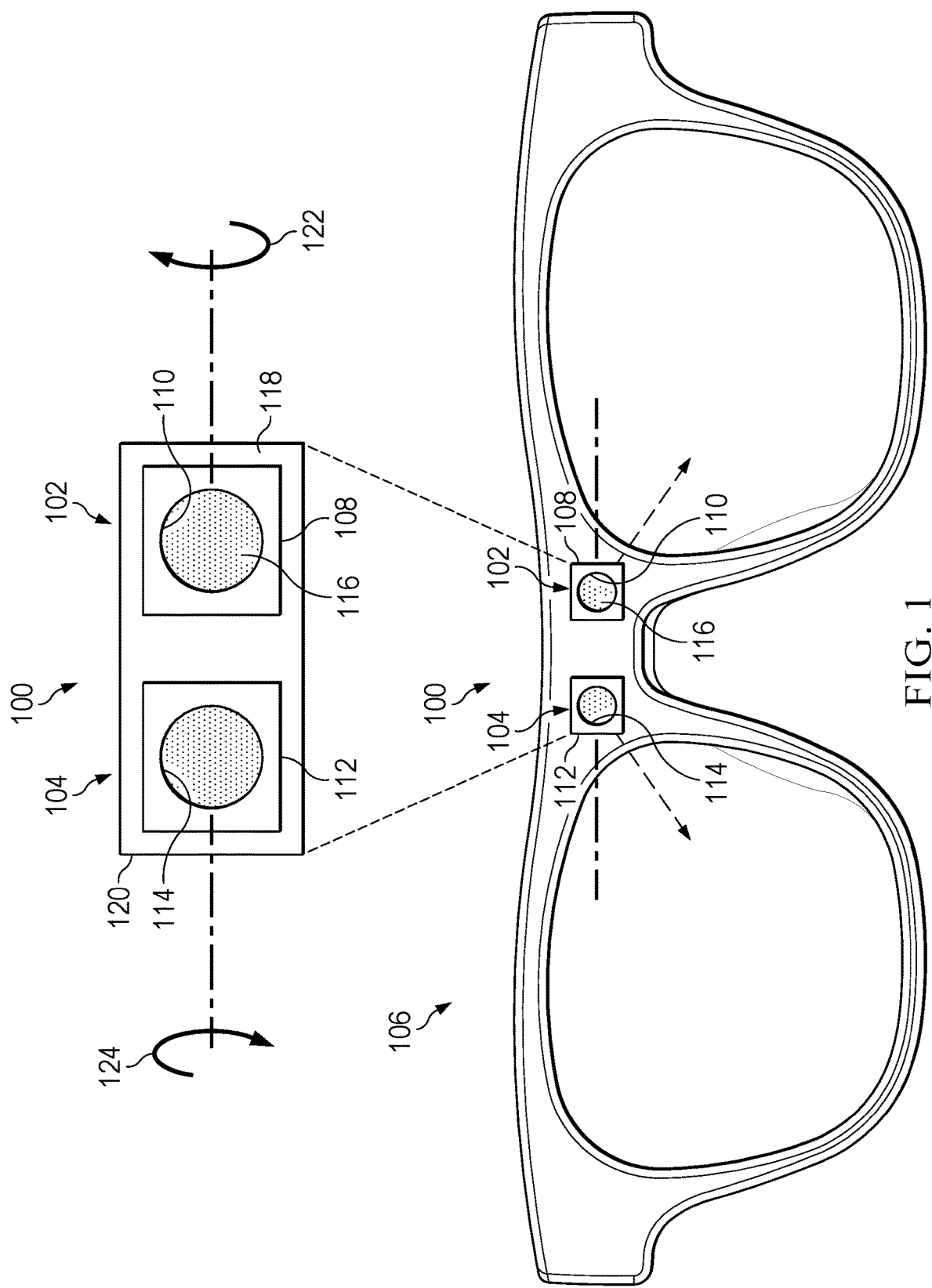
FIG. 1 is a diagram illustrating a front view of an AR optical projector system including a left-eye projector and a right-eye projector implemented in a set of AR glasses in accordance with some embodiments.

FIG. 1 illustrates an AR optical projector system 100 with a left-eye projector 102 and a right-eye projector 104. The AR optical projector system 100 has a first plate 108 and a second plate 112, that may be referred to as a set of oscillating plates, implemented in a set of AR glasses 106. For example, the left-eye projector 102 has a first plate 108 disposed at a first aperture 110 and rotated about a first orthogonal axes to achieve pixel shifting in a first direction. The right-eye projector 104 has a second plate 112 disposed at a second aperture 114 and rotated about a second axes to achieve pixel shifting in a second direction differing from the first direction of the first plate 108. The first plate 108 and the second plate 112 may be composed of a transparent substrate such as plastic and/or glass.

The AR optical projector system 100 further includes a microLED panel 120 with a pixel array 116 disposed at a backplane 118. The first plate 108 rotates in a first direction 122 opposite a second direction 124 of rotation of the second plate 112. In some aspects, the AR optical projector system 100 is located at a bridge of the set of AR glasses 106. The area at the bridge of the nose is referred to as the term "nose bridge" or "bridge." This section of the HMD houses components for the AR optical projector system 100. In some aspects, the AR optical projector system 100 is located at a temporal area (not shown) of a head-mounted display (HMD). The area on the outside of each lens near the temple is often referred to as the term "temple" or "temporal area." This part of the HMD corresponds to the side arms or sidepieces that extend from the lenses toward the user's temples. Light is emitted from the pixel array 116 through the first aperture 110 forming an exit pupil of the AR optical projector system 100. The AR optical projector system 100 is configured to project collimated light from the pixel array 116 to the first plate of the set of plates that is oscillated out of phase with a second plate of the set of plates, as shown in FIGS. 2 and 3.

Figure 2:
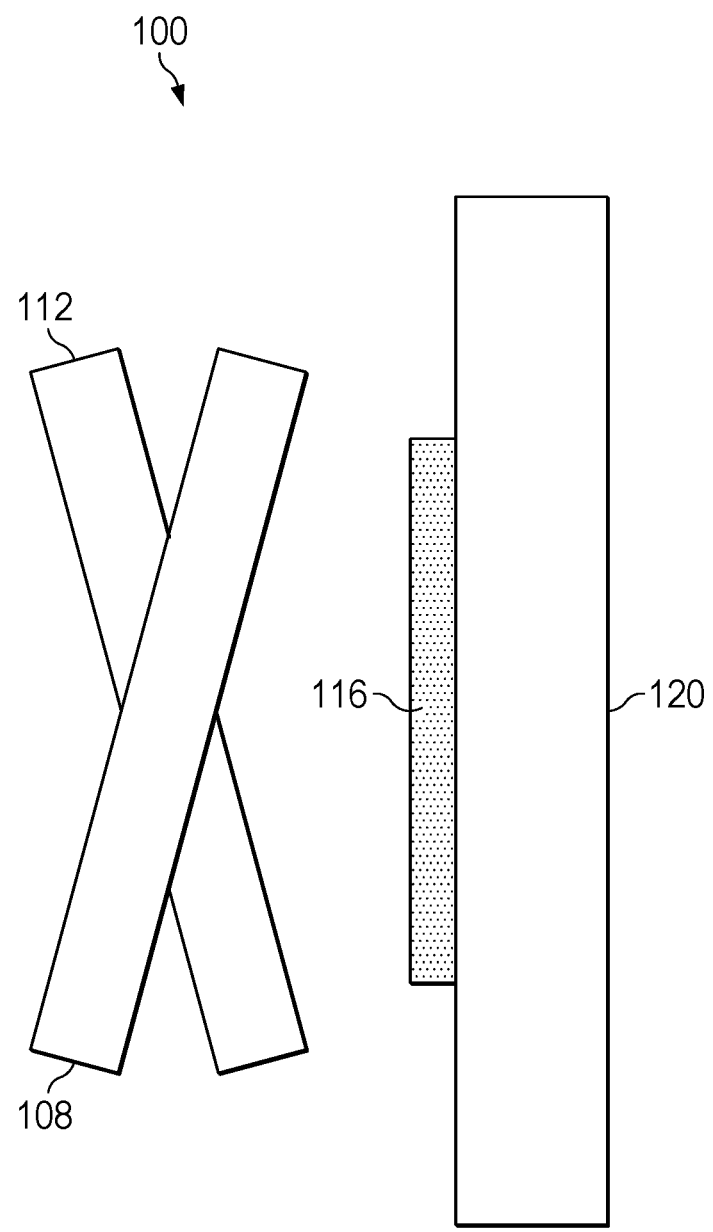
FIG. 2 is a diagram illustrating a side view of the AR optical projector system of FIG. 1 including a first plate of a set of plates rotated out of phase with a second plate of the set of plates and disposed over a microscopic light-emitting diode (microLED) panel in accordance with some embodiments.
Figure 3:
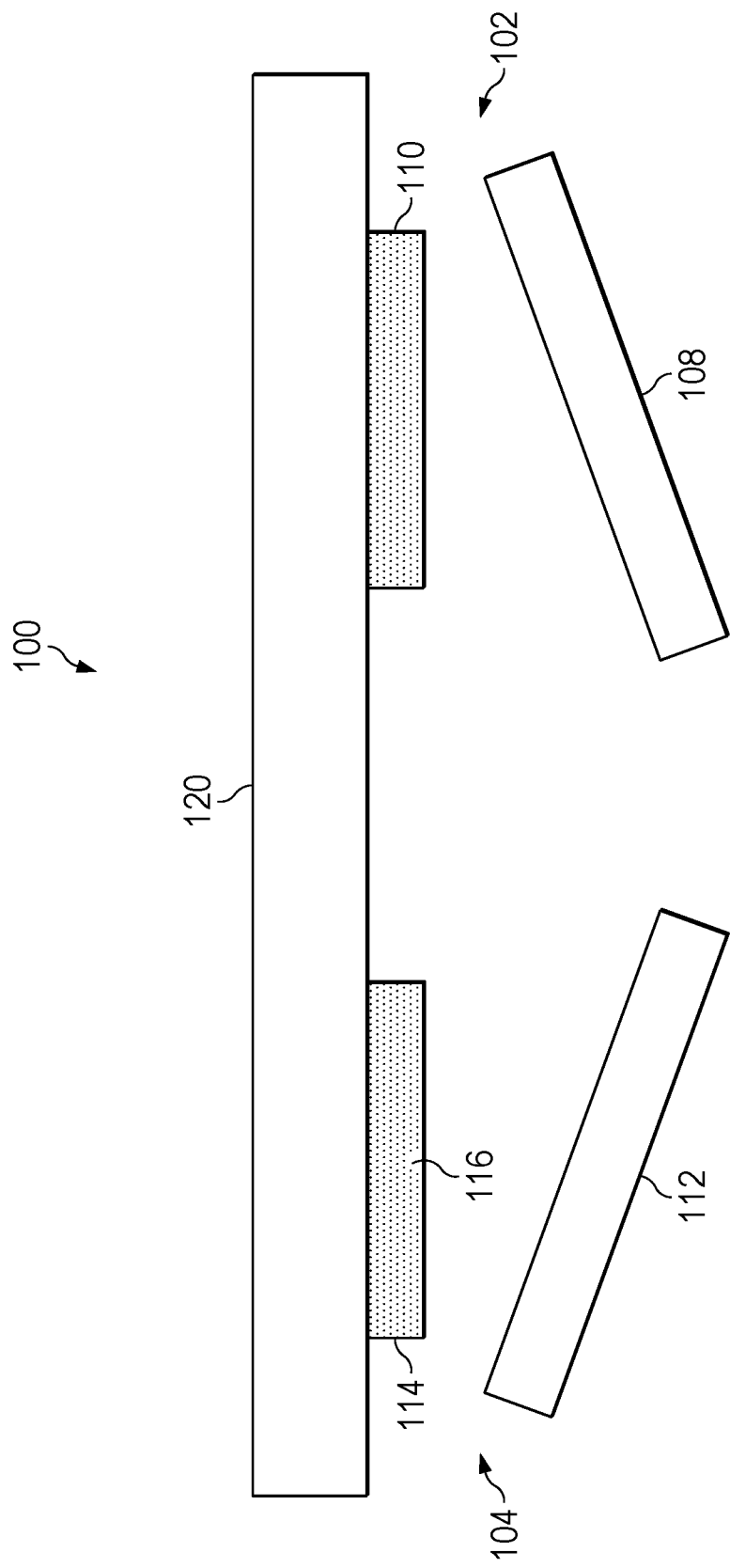
FIG. 3 is a diagram illustrating a top view of the AR optical projector system of FIGS. 1 and 2 including the first plate of the set of plates rotated out of phase with the second plate of the set of plates and disposed over the microLED panel in accordance with some embodiments.

FIGS. 2 and 3 illustrate the lateral displacement of the first plate 108 of the set of plates rotated out of phase with the second plate 112 of the set of plates of the AR optical projector system 100. The first plate 108 and the second plate 112 are substantially coplanar to the pixel array 116 of the microLED panel 120. In some aspects, the microLED panel 120 of the AR optical projector system 100 includes an array of red-green-blue (RBG) pixels (not shown).

The AR optical projector system 100 may feature multiple plates, composed of a transparent substrate such as plastic or glass, capable of rotation either about a common axis or their individual axes. These rotations may be facilitated by distinct actuators such as voice coils, piezo actuators, and/or others, each capable of linear or rotary movement. The plates may be either driven individually but synchronized for cohesive operation, or jointly propelled by a shared actuator for collective movement. Actuation mechanisms, whether shared or distinct, may be controlled by common driving electronics to ensure synchronization in their movements. Mounting and permitting plate rotation may involve the use of flexures, such as a resilient material, instead of traditional rotational joints like bearings or bushings, which provides a more flexible and reliable means for rotation. Each glass plate may cover either a single or multiple apertures, serving functions related to the desired image manipulation, color separation, or altering the field-of-view for improved projection. In an embodiment, a set of glass plates are configured to rotate about a single axis and the set of plates may rotate around pairs of orthogonal axes to achieve pixel shifting in multiple directions. First plate 108 and second plate 112 are configured to oscillate out of phase with each other in the AR optical projector system 100 that may be interconnected with a waveguide to form an AR optical projection system as described in FIG. 4.

FIG. 4 illustrates an AR optical projection system 400 including microLED panel 120, the first plate 108, and the second plate 112 of the AR optical projector system 100 of FIGS. 1 and 3-4 oriented within the optical path of a waveguide 402. The left-eye projector 102 and the right-eye projector 104 are each within the optical path 404 of an input coupler (IC) 406 of the waveguide 402. One or more projector optical elements 408 such as a projector lens, a global lens, and/or a micro lens may be positioned between the oscillating plates and the IC 406 of the waveguide 402. One or more projector optical elements 408 may be located within the optical pathway between the first plate 108 and second plate 112 and the IC 406 of the waveguide 402. In an example, a projector lens may be disposed at a surface of the set of plates to collimate projected light from the microLED panel. The IC 406 has an entrance pupil substantially coplanar with the exit pupil of the AR optical projector system 100. Their positioning and function could involve tasks such as focusing, light manipulation, or image adjustment to optimize the projected images before they enter the waveguide 402 for display in an AR display. An output coupler (OC) 410 is substantially coplanar with an eye 412 of a user.

In some aspects, an actuator may connect to the set of plates to orient a first plate of the set of plates out of phase with a second plate of the set of plates. In some aspects, an actuator may connect to a first plate of the set of plates and be configured to employ the oscillating out of phase. A resilient material (not shown) may be connected to the set of plates and be configured to orient the first plate of the set of plates out of phase with a second plate of the set of plates. A single actuator (not shown) may connect to one plate, which then drives another plate out of phase, and linkages or flexures (not shown) may be used as connectors between the two plates. These flexures serve as compliant elements that enable the transmission of motion or displacement from the first plate to the second while ensuring a controlled and synchronized movement. Flexures provide minimal friction, precision in movement, and resilience to wear and tear compared to traditional joints like hinges or bearings. A flexure refers to a mechanical component used to facilitate controlled and precise movement between two connected plates. Flexures are often slender structures made of a flexible material, designed to allow a controlled amount of bending or movement in a specific direction while maintaining stability in other directions. They allow for controlled and reliable transmission of motion between components, aiding in the precise manipulation of the oscillating plates in AR optical projection system 400. In some aspects, the techniques described herein relate to an AR display, further including: a third plate configured to phase shift at 120 degrees from a first plate and the second plate of the set of plates.

In some aspects, an actuator may be connected to a first plate of the set of plates and configured to employ the oscillating out of phase. A driving link (not shown) connected to the set of plates and configured to orient the first plate of the set of plates out of phase with a second plate of the set of plates. A driving link refers to a component that connects an actuator to multiple other components, such as plates or mechanisms, in order to transfer motion or force from the actuator to these connected elements. When a single actuator is linked to a driving link, the driving link serves as an intermediary component that transmits the motion or force generated by the actuator to drive multiple plates simultaneously, albeit out of phase. This driving link efficiently distributes the movement or force from the actuator to the connected plates, allowing for coordinated and synchronized motion among these plates. The driving link essentially acts as a transmission mechanism, ensuring that the motion generated by the actuator is appropriately distributed among the multiple plates, enabling them to operate in harmony despite being driven by a single source. This arrangement is commonly used in complex systems, such as those found in projection technologies for augmented reality or related applications, to efficiently control and manipulate multiple components using a centralized actuator.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. An augmented reality (AR) display comprising:
a light engine, comprising:
a microscopic light-emitting diode (microLED) panel;
an exit pupil; and
a set of plates disposed at the microLED panel, the set of plates comprising two or more plates and each plate of the set of plates configured to oscillate out of phase with at least one other plate of the two or more plates of the set; and
a waveguide comprising:
an input coupler (IC) having an entrance pupil that is coplanar with the exit pupil of the light engine.

2. The AR display of claim 1, further comprising:
a projector lens disposed at a surface of the set of plates to collimate projected light from the microLED panel.

3. The AR display of claim 1, further comprising:
an actuator connected to the set of plates and configured to oscillate a first plate of the set of plates out of phase with a second plate of the set of plates.

4. The AR display of claim 1, further comprising:
an actuator connected to a first plate of the set of plates and configured to oscillate each of the plates of the set of plates; and
a resilient material connected to the set of plates and configured to oscillate the first plate of the set of plates out of phase with a second plate of the set of plates.

5. The AR display of claim 1, further comprising:
an actuator connected to a first plate of the set of plates and configured to oscillate each of the plates of the set of plates; and
a driving link connected to the set of plates and configured to oscillate the first plate of the set of plates out of phase with a second plate of the set of plates.

6. A head mounted display (HMD) comprising the AR display of claim 1, and wherein the light engine is located at a bridge of the HMD.

7. A head mounted display (HMD) comprising the AR display of claim 1, and wherein the light engine is located at a temporal area of the HMD.

8. The AR display of claim 1, further comprising:
a third plate configured to phase shift at 120 degrees from a first plate and a second plate of the set of plates.

9. The AR display of claim 1, wherein the microLED panel comprises an array of red-green-blue (RBG) pixels.

* * * * *